Figure 1:
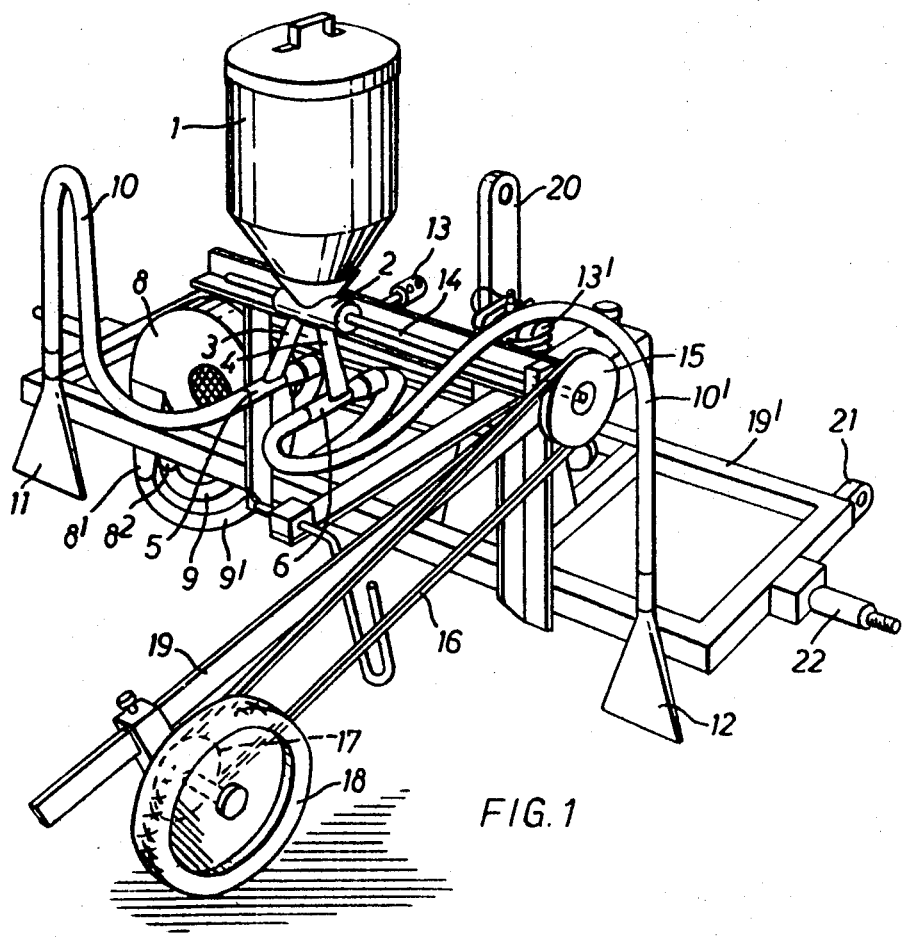
Figure 2:
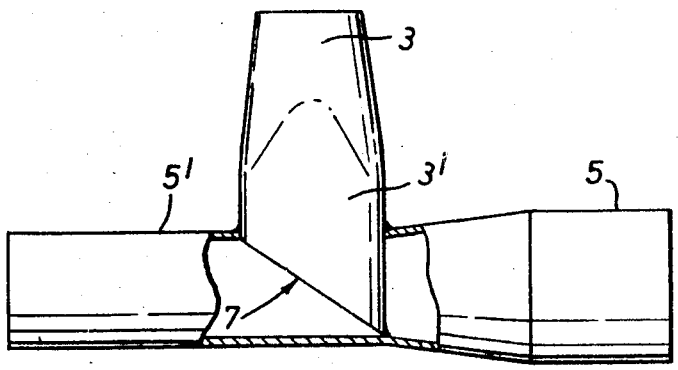
Figure 3:
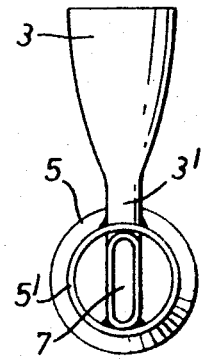
Figure 4:
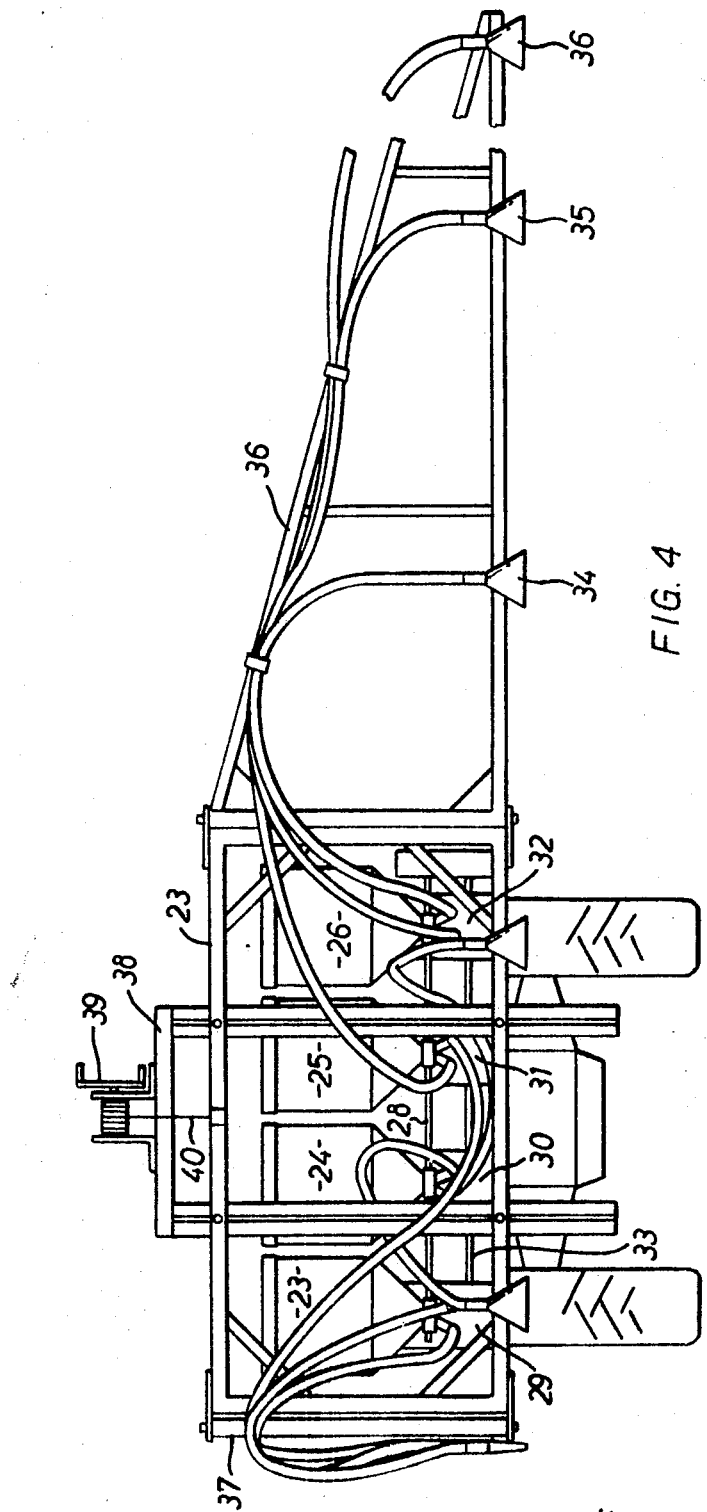

United States Patent

[11] 3,596,805

| [72] | Inventor | Horstine Farmery<br>North Newbald, York, Yorkshire, England |
|---|---|---|
| [21] | Appl. No. | 791,103 |
| [22] | Filed | Jan. 14, 1969 |
| [45] | Patented | Aug. 3, 1971 |

[54] APPLICATORS OF GRANULAR AND POWDER MATERIAL
4 Claims, 4 Drawing Figs.

| [52] | U.S. Cl. | 222/193 |
|---|---|---|
| [51] | Int. Cl. | B67d 5/54 |
| [50] | Field of Search | 222/190, 193, 187 |

[56] References Cited
UNITED STATES PATENTS

| 1,444,648 | 2/1923 | Willis et al. | 222/193 |
| 1,462,861 | 7/1923 | Jordan | 222/193 X |
| 2,310,620 | 2/1943 | Dye | 222/193 |
| 2,425,419 | 8/1947 | Carnes | 222/193 |

*Primary Examiner*—Raphael H. Schwartz
*Attorney*—Hall, Pollock & Vande Sande

ABSTRACT: An applicator movable over the ground for applying powder and granular materials such as insecticides, herbicides, fertilizers and such like onto such ground and onto crops growing on such ground including at least one gravity hopper for holding said materials and feeding the same into a rotary metering device discharging into at least one but not more than two depending feed ducts each opening into an airflow duct where a venturi effect is created, a power-driven blower delivering air to said airflow duct which is connected by a flexible hose to a discharge nozzle, and means for driving said metering device at a speed related to movement of the applicator over the ground.

PATENTED AUG 3 1971

SHEET 1 OF 2

3,596,805

HORSTINE FARMERY — Inventor

Hall, Pollock + Vande Sande — Attorneys

APPLICATORS OF GRANULAR AND POWDER MATERIAL

BACKGROUND TO THE INVENTION

Materials such as insecticides, herbicides, fertilizers and such like must be applied either onto the ground or onto growing crops and as the same must be distributed substantially evenly to obtain the best results it is necessary to meter the rate of feed, conveniently by relating the feed rate to the movement of the applicator apparatus over the ground.

A rotary metering device known per se will accurately regulate the flow of granular and powder material when the material is to be discharged by gravity from a hopper to one or two discharge ducts which may be connected by flexible ducting to discharge nozzles. Serious problems are, however, encountered when the discharge nozzles have to be positioned at different heights, facing different directions or at substantial spacing apart while still giving substantially equal discharge.

Attempts have, therefore, been made to blow the materials for discharge through the nozzles. Where powders alone come into consideration and the metering need not be precise, it is easy to provide a controlled feed of the powder into the fan of a blower and blow it out at several points in the required direction and at desired heights through a plurality of ducts each terminating in a nozzle. It is, however, not possible to do this with granular material which must not be broken up and when the amount of material must be equally discharged through several nozzles to give an even spread, as air tends to take the easier path and will consequently carry different quantities of material to the different nozzles.

To treat a given area of ground or the crops growing on such ground area it is of course possible to provide a plurality of hoppers each feeding to a discharge duct or pair of discharge ducts and a plurality of such units may be mounted on a tractor or as a trailer but when, for economy of labor and power, the travel path is wide the spacing of the units is inconvenient and cumbersome, and it is difficult to mount the units so that each will operate to give equal discharge of material through its nozzle.

SUMMARY OF THE INVENTION

The invention relates to applicators for applying insecticides, herbicides, fertilizers and such like materials onto the ground and onto growing crops, and has for its object to conduit and give venturi effect due to the air passing on each side of such flattened end when is cut at an angle to the axis of the conduit to provide a downstream facing discharge.

A further object of the invention is to provide a plurality of applicators each with its metering device and discharge nozzle or pair of discharge nozzles for giving a wide spread even distribution of the granular or powder material.

Thus the applicator according to the present invention has a gravity hopper for holding said materials, a rotary metering device receiving material from said hopper, a depending feed duct from said metering device, an airflow conduit in which a venturi effect is created with said feed duct opening into said airflow conduit where the venturi effect is created, a blower for delivering air to said airflow conduit, means for driving said blower, a discharge nozzle, a flexible hose connecting said airflow conduit to said nozzle, and means for driving said metering device at a speed related to movement of the applicator over the ground.

BRIEF DESCRIPTION OF DRAWINGS

FIG. 1 is a perspective view of the applicator shown on a composite mounting suitable for connection to a tractor three point linkage or to be provided with wheels as a trailer or free vehicle, FIG. 2 is a part sectional longitudinal view of the material feed venturi in the airflow conduit;

FIG. 3 is a view on the left-hand side of FIG. 2, and

FIG. 4 is a rear view of a tractor with a mounting thereon comprising a framework carrying four applicators with some nozzles carried on such framework and others carried by two booms pivoted thereto.

DESCRIPTION OF PREFERRED EMBODIMENT OF THE INVENTION

Referring now to the said drawings and in particular to FIG. 1 thereof, the applicator comprises a gravity hopper 1 feeding to a rotary metering device 2 having two equal outputs which pass respectively into depending circular section rigid feed ducts 3 and 4 which extend into rigid airflow conduits 5, 6 in which each such duct 3 is flattened as at $3^1$ to oval section (see FIG. 3) to extend diametrically across its airflow conduit through which the airflow is restricted with venturi effect to that which passes on each side of the feed duct end which is cut at an angle (see FIG. 2) of some 45° to the axis of the airflow conduit to provide a downstream facing discharge 7. Each airflow conduit 5, 6 is conveniently reduced in diameter upstream of where the feed duct enters it and continues as the smaller diameter as shown at $5^1$ in FIG. 2.

A blower 8, which has two outputs $8^1$, $8^2$ into which air is substantially equally discharged, has its outputs connected by substantially equal length flexible hoses 9, $9^1$ to the airflow conduits 5 and 6 respectively, which are in turn connected by substantially equal length flexible hoses 10, $10^1$ to discharge nozzles 11, 12 respectively. The blower 8 may be driven by a shaft 13 connectable to a tractor power takeoff or by a motor $13^1$, such as an internal combustion engine, provided for the purpose and which may also serve as propulsion motor when the applicator is made up as a self-propelled vehicle.

The rotary metering device 2 is driven by a shaft 14 on which is a pulley 15 connected by an endless belt 16 to a pulley 17 fast with a ground wheel 18 rotatably mounted at the free end of a rockable arm 19, so that the rotary metering device 2 is driven at a speed related to the movement of the applicator over the ground. During operation there is a continuous flow of air from the blower 8 through to the nozzles 11, 12 and during movement over the ground there is metered discharge of the material in the hopper 1 into the feed ducts 3, 4 to be blown out equally with even spread with the air discharged through the nozzles 11, 12.

The applicator constituent parts are mounted on a framework $19^1$ which may have attachment fittings 20, 21 enabling it to be connected to the three-point linkage of a tractor as a tractor mountable unit and which may have stub axles 22 on which ground wheels may be mounted to form a trailer vehicle or self-propelled vehicle.

Two or more applicators may be built onto a framework. Thus as shown in FIG. 4, four applicators are built on a framework 23 with the hoppers 24, 25, 26 and 27 in juxtaposition and with their metering devices all driven by a common shaft 28. The four blowers 29, 30, 31 and 32 are also driven by a common shaft 33 driven from the power takeoff of the tractor on which the framework is mounted while the shaft 28 may be driven from the tractor final driven to the driven wheels and at a related speed. As shown, some of the discharge nozzles which are spaced at substantially equal distances apart i.e. nozzles 34, 35, $35^1$ may be mounted on a boom 36 connected about vertical axis pivots to the one end of the framework 23 with three other nozzles on a like boom 37 pivoted in like manner to the other end of the framework, in an arrangement in which the booms may be swung out as is the boom 36 to provide a wide treatment path and alternatively folded as is the boom 37 to reduce the width as during travel, permitted by the flexibility of the substantially equal length hoses leading to the nozzles carried by the respective booms.

The framework 23 may be carried for vertical height adjustment by a mounting framework 38 provided with a winch 39 and cable 40 for adjusting the height.

I claim:

1. An applicator movable over the ground for applying powder and granular materials onto such ground and onto crops growing on said ground including, a gravity hopper for holding said materials,
a metering device receiving materials from said hopper,
a depending feed duct from said metering device and extending into an airflow conduit, said depending duct being of circular cross section but being flattened to oval section where it extends into said airflow conduit so as to extend diametrically across said airflow conduit, the end of such flattened portion being cut at an angle to the axis of the conduit to provide a downstream facing discharge,
a blower for delivering air to said airflow conduit,
means for driving said blower,
at least one discharge nozzle,
a flexible hose connecting said airflow conduit to said nozzle,
and means for driving said metering device at a speed related to movement of the applicator over the ground.

2. An applicator movable over the ground for applying powder and granular materials on such ground and onto crops growing on said ground including,
a gravity hopper for holding said materials,
a metering device receiving material from said hopper,
a depending feed duct from said metering device and extending into an airflow conduit,
a blower for delivering air to said airflow conduit,
means for driving said blower,
at least one discharge nozzle,
a flexible hose connecting said airflow conduit to said nozzle,
and means for driving said metering device at a speed related to movement of the applicator over the ground,
said metering device having two outlets each delivering to a depending feed duct,
said blower having two outputs each feeding to one of two airflow conduits,
and two flexible hoses connecting said airflow conduits to respective ones of said nozzles.

3. An applicator movable over the ground for applying powder and granular materials on such ground and onto crops growing on said ground including,
a gravity hopper for holding said materials,
a metering device receiving material from said hopper,
a depending feed duct from said metering device and extending into an airflow conduit,
a blower for delivering air to said airflow conduit,
means for driving said blower,
at least one discharge nozzle,
a flexible hose connecting said airflow conduit to said nozzle,
and means for driving said metering device at a speed related to movement of the applicator over the ground,
said last-named means comprising a land wheel carried by a pivoted arm, a pulley rotatable by said land wheel, a second pulley on a driving shaft of said metering device, and an endless belt for rotating said pulleys.

4. An applicator movable over the ground for applying powder and granular materials on such ground and onto crops growing on said ground including,
a plurality of hoppers carried by a framework in side-by-side relationship,
a plurality of metering devices each associated with a respective one of said hoppers for receiving materials from the respective hopper,
a plurality of depending feed ducts each associated with a respective one of said metering devices and each extending into a respective airflow conduit,
a plurality of blowers each delivering air to a respective one of said airflow conduits,
a discharge nozzle associated with each airflow conduit,
a flexible hose connecting each said airflow conduit to its respective nozzle,
a common shaft for driving the plurality of metering devices of said hoppers at a speed related to movement of the applicator over the ground,
a common power source for driving said plurality of blowers,
said plurality of discharge nozzles being spaced substantially equal distances apart,
a boom,
and means for pivotally connecting said boom to said framework,
at least some of said nozzles being mounted on said boom.